(12) United States Patent  
Jakobsson

(10) Patent No.: US 8,505,961 B2
(45) Date of Patent: Aug. 13, 2013

(54) CURTAIN AIRBAG FOR A MOTOR VEHICLE AND BRACKET FOR FASTENING A CURTAIN AIRBAG TO A MOTOR VEHICLE

(75) Inventor: Börje Jakobsson, Brämhult (SE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 13/139,202

(22) PCT Filed: Dec. 3, 2009

(86) PCT No.: PCT/EP2009/008619
§ 371 (c)(1),
(2), (4) Date: Jul. 20, 2011

(87) PCT Pub. No.: WO2010/066371
PCT Pub. Date: Jun. 17, 2010

(65) Prior Publication Data
US 2011/0266778 A1 Nov. 3, 2011

(30) Foreign Application Priority Data

Dec. 11, 2008 (DE) .......................... 10 2008 061 282

(51) Int. Cl.
*B60R 21/213* (2006.01)
(52) U.S. Cl.
USPC .................................... 280/728.2; 280/730.2
(58) Field of Classification Search
USPC .......................................... 280/728.2, 730.2
See application file for complete search history.

(56) References Cited

U.S. PATENT DOCUMENTS

| 6,415,560 | B1 * | 7/2002 | Rinderer ...................... 52/167.1 |
| 7,523,958 | B2 * | 4/2009 | Jang et al. .................. 280/730.2 |
| 7,547,038 | B2 * | 6/2009 | Coleman .................... 280/728.2 |
| 7,748,730 | B2 * | 7/2010 | Kashiwagi ................. 280/728.2 |
| 7,753,402 | B2 * | 7/2010 | Volkmann et al. ......... 280/728.2 |
| 7,823,914 | B2 * | 11/2010 | Cheal et al. ............... 280/730.2 |
| 7,980,585 | B2 * | 7/2011 | Cheal ......................... 280/728.2 |
| 8,056,924 | B2 * | 11/2011 | Hatfield et al. ............ 280/730.2 |
| 8,220,825 | B2 * | 7/2012 | Bonarens et al. .......... 280/728.2 |
| 8,240,701 | B2 * | 8/2012 | Cheal et al. ............... 280/728.2 |
| 2006/0119084 | A1 * | 6/2006 | Coon et al. ................. 280/730.2 |
| 2006/0197316 | A1 * | 9/2006 | Watanabe ................... 280/728.2 |
| 2007/0024031 | A1 * | 2/2007 | Coleman .................... 280/728.2 |
| 2007/0241539 | A1 * | 10/2007 | Jang et al. .................. 280/728.2 |

FOREIGN PATENT DOCUMENTS

| DE | 10 2006 049 431 A1 | 4/2008 |
| JP | 2004-262399 A | 9/2004 |
| WO | WO-2007/018650 A2 | 2/2007 |

* cited by examiner

Primary Examiner — Drew Brown
(74) Attorney, Agent, or Firm — Harness, Dickey & Pierce, P.L.C.

(57) ABSTRACT

A curtain airbag for a motor vehicle includes a two-layer lug for fastening to the motor vehicle formed by a first layer which is folded back upon itself to a second layer. The two-layer lug includes an opening in the area of the fold. A bracket is provided between the layers. The bracket projects through the opening with a fastening shoulder, and the curtain airbag can be fastened to the motor vehicle via the fastening shoulder.

20 Claims, 4 Drawing Sheets

CURTAIN AIRBAG FOR A MOTOR VEHICLE AND BRACKET FOR FASTENING A CURTAIN AIRBAG TO A MOTOR VEHICLE

CROSS-REFERENCE TO RELATED APPLICATIONS

This application is a U. S. National Stage Application of International application No. PCT/EP2009/008619, filed Dec. 3, 2009, and published in English as WO/2010/066371 on Jun. 17, 2010. This application claims the benefit of German Application No. 10 2008 061 282.0. The disclosures of the above applications are incorporated herein by reference.

FIELD

The invention relates to a curtain airbag comprising the features of the preamble of claim 1 and to a bracket for fastening a curtain airbag to a motor vehicle.

BACKGROUND

Curtain airbags for motor vehicles have the function to protect the passenger against hitting the lateral car body in particular during a side impact or a rear impact. Furthermore, curtain airbags have the function to prevent the passenger from being partly or entirely thrown out of the vehicle through a window. For this purpose, the curtain airbag is packed up to a roll or to a package and is fastened above the car body to be covered in the passenger compartment of the motor vehicle. During a side impact or a rear impact, the curtain airbag unfolds in the downward direction between the passenger and the car body and thereby prevents the passenger from directly hitting the car body during the accident.

From WO 2007/018650 A2, for example, a curtain airbag of this kind extending from the A-pillar to the D-pillar of the motor vehicle is known, which curtain airbag in the inflated state covers nearly the whole side body of the passenger compartment of the motor vehicle. The curtain airbag is fastened to the car body above the windows by means of lugs having a two-layer configuration and comprising a fastening opening for mounting a fastening means. The area of the fastening openings is enforced by dimensionally stable clips, which are laterally inserted in the two-layer lug and which comprise identical fastening openings, which, in the fastened state of the clips, are positioned congruently over the fastening openings in the lugs. Being fastened like this, the fastening force of the curtain airbag is introduced into the lug punctually via the fastening means in the fastening opening so that the lugs have to be designed accordingly in a load-bearing manner and to be accessible for the assembly in the motor vehicle.

SUMMARY

It is an object of the invention to provide a curtain airbag of the above-described kind with an improved fastening to the motor vehicle and a bracket for fastening a curtain airbag to a motor vehicle, in which bracket the fastening force is introduced into the curtain airbag in the most distributed way possible.

The solution of the object is achieved by a curtain airbag comprising the features of claim 1 and a bracket comprising the features of claim 16. Preferred embodiments can be learned from the sub claims.

According to the invention, a curtain airbag for a motor vehicle according to claim 1 comprising a two-layer lug for the fastening to the motor vehicle, which lug is formed by a first layer folded back upon itself to a second layer, is proposed, in which curtain airbag the two-layer lug comprises an opening in the area of the fold, and a bracket is provided between the layers, which bracket projects through the opening with a fastening shoulder, and the curtain airbag can be fastened to the motor vehicle via the fastening shoulder.

Due to the proposed fastening, the introduction of the fastening force into the lug is no longer effected punctually, but instead is effected in a distributed manner over an area via the bracket located in the two-layer lug. Owing to the distribution of the fastening force in the lug via the bracket, the maximum loads generated in the lug are substantially reduced and, thus, the risk of the lug being torn out is substantially reduced. Furthermore, the lug itself can have a substantially shorter and thus self-stiffer configuration, as the fastening of the curtain airbag is effected via the fastening shoulder projecting over the lug. It has turned out to be a further unexpected advantage that the fastening via the bracket can be realized in a substantially more accurately fitting manner without any possibility for the curtain airbag of moving in relation to the vehicle structure so that possible rattling noises between the curtain airbag and the car body are avoided.

A particularly good homogeneous distribution of the retaining forces results from the bracket with one side resting against the inner surface of the fold.

It is further proposed that the bracket comprises a planar plate-shaped structure. Thereby, on the one hand, the lug itself is dimensionally stabilized, and, on the other hand, a big connecting and force transmitting area between the bracket and the lug is provided.

It is further proposed that the bracket has a greater stiffness than the lug. Thereby, the lug can have a flexible configuration being advantageous with regard to the fastening to the textile of the curtain airbag, whereas the bracket can just have an accordingly stiffer configuration in order to absorb the retaining forces. The bracket, for example, can be manufactured in a very simple way as a stamping part made of metal, whereas the lug can be formed from a textile, preferably the same textile as the curtain airbag.

A further preferred embodiment of the invention is that the width of the bracket is bigger than the width of the lug, and that the surface of the lug contacting the bracket is laterally limited by projecting dogs. By the proposed dogs, the lug is prevented from slipping sideways in relation to the bracket.

The risk of the lug being torn out can be further reduced by the bracket being turned back upon itself on the side, via which the load is introduced from the curtain airbag into the bracket in order to form a bigger radius. By means of the bigger radius, the contact surface of the lug in the contacting area of the side of the bracket, via which side the load is introduced, i.e. the area, which is exposed to a particular great load by the retaining force, is increased so that the retaining force introduced into the lug is further distributed and the maximum load is further reduced. The radius generated by the bracket being turned back upon itself can be chosen at any size, whereas possible sharp edges of the bracket can no longer lead to a cutting of the lug.

It is further proposed that the fastening shoulder comprises a non-circular fastening opening. By means of the non-circular fastening opening, the fastening of the lugs is further effected in a predetermined position and in a rotationally secured manner.

A further preferred embodiment of the invention is that the curtain airbag is held together to a package by a wrapper, and that the wrapper with one end is mounted on the bracket. Thereby, the bracket is used for fastening the curtain airbag as well as for tying the airbag up to a package. The curtain airbag is held together to a pre-assembly by the wrapper so that the whole package pre-mounted as an assembly just has to be fastened to the vehicle via the fastening means in the bracket. Fastening the wrapper to the bracket provides the advantage that the airbag can be fastened to the motor vehicle as well as is held together in a self-securing manner solely by the bracket. Additional fastening means for the wrapper are thus not necessary.

For fastening the wrapper, the same can comprise an opening, by means of which the wrapper can be fastened on the fastening shoulder. Thus, one and the same fastening shoulder is used for both the fastening to the vehicle and for retaining the wrapper, whereby the overall construction is further simplified. Furthermore, after the curtain airbag having been fastened to the vehicle, the wrapper is additionally prevented from slipping off the fastening shoulder by the fastening means engaging with the fastening shoulder.

A particularly simple and cost-effective embodiment of the invention results from the wrapper and the lug having a one-piece configuration. As the lug is sewed to the curtain airbag on one side, the wrapper with one end simultaneously is fastened thereby to the curtain airbag and only has to be fastened to the bracket in order to pack up the curtain airbag.

In this case, it is proposed that the lug is fastened to the curtain airbag by two spaced straps, and that the wrapper is formed by a third strap of the lug located between the two spaced straps. The proposed arrangement of the straps results in a symmetric configuration of the lug so that the same does not run the risk of slipping in relation to the curtain air-bag, and it is further ensured that the wrapper is torn up when the curtain airbag is unfolded and cannot needlessly disturb the unfolding process.

It is further proposed that the hollow space formed between the layers for mounting the bracket is limited by the straps being fastened to the curtain airbag and/or by the straps extending in different directions in such a way that the bracket located between the layers is secured against slipping out to the side.

A further preferred embodiment of the invention is that the fastening shoulder is arranged on the bracket via a narrow point. Thus, a weak point is intentionally created, in which the bracket may deform under load without the fastening shoulder itself deforming thereby or the bracket deforming in other sections. Furthermore, the wrapper can wrap around the fastening shoulder in the narrow point area so that the wrapper is secured on the fastening shoulder in a hook-like manner and, even under load, cannot slip off.

Furthermore, for the solution of the object, claim 16 proposes a bracket for fastening a curtain airbag to a motor vehicle, which bracket comprises a base body, which can be positioned between two layers of the curtain airbag, and a fastening shoulder, which can be pushed through an opening provided in the connecting area of the layers. Designing the bracket according to the invention, the same is used for both the fastening to the motor vehicle and for the distribution of the fastening forces in the curtain airbag, wherein the distribution of the fastening forces in the curtain airbag is independent of the type of fastening the bracket to the motor vehicle. Furthermore, the fastening now is no longer realized via the curtain airbag itself, but via the bracket proposed according to the invention so that the curtain airbag itself no longer needs to comprise a fastening point accessible from the outside. The layers of the curtain airbag, between which the base body of the bracket shall be positionable, can be formed from both the textile of the curtain airbag itself and from lugs arranged on the same. What merely is important about the fastening by means of the proposed bracket is that the bracket with its base body located between the layers encounters a counter bearing at the connecting point of the layers, via which counter bearing the fastening force can be introduced into the curtain airbag over the widest area possible.

In this case, it is further proposed that the fastening shoulder is connected to the base body via a narrow point.

It is further proposed that the width of the fastening shoulder is bigger than the width of the opening. Thereby, the bracket can no longer slip out of the opening after having been positioned between the layers and after the fastening shoulder having been pushed through the opening.

Furthermore, the base body can comprise dogs projecting from the contact surface of the layers of the curtain airbag so that the layers resting against the contact surface are secured against slipping to the side.

BRIEF DESCRIPTION OF THE DRAWINGS

In the following, the invention is described in more detail on the basis of a preferred embodiment. The figures show in detail.

DETAILED DESCRIPTION

Figure 1:
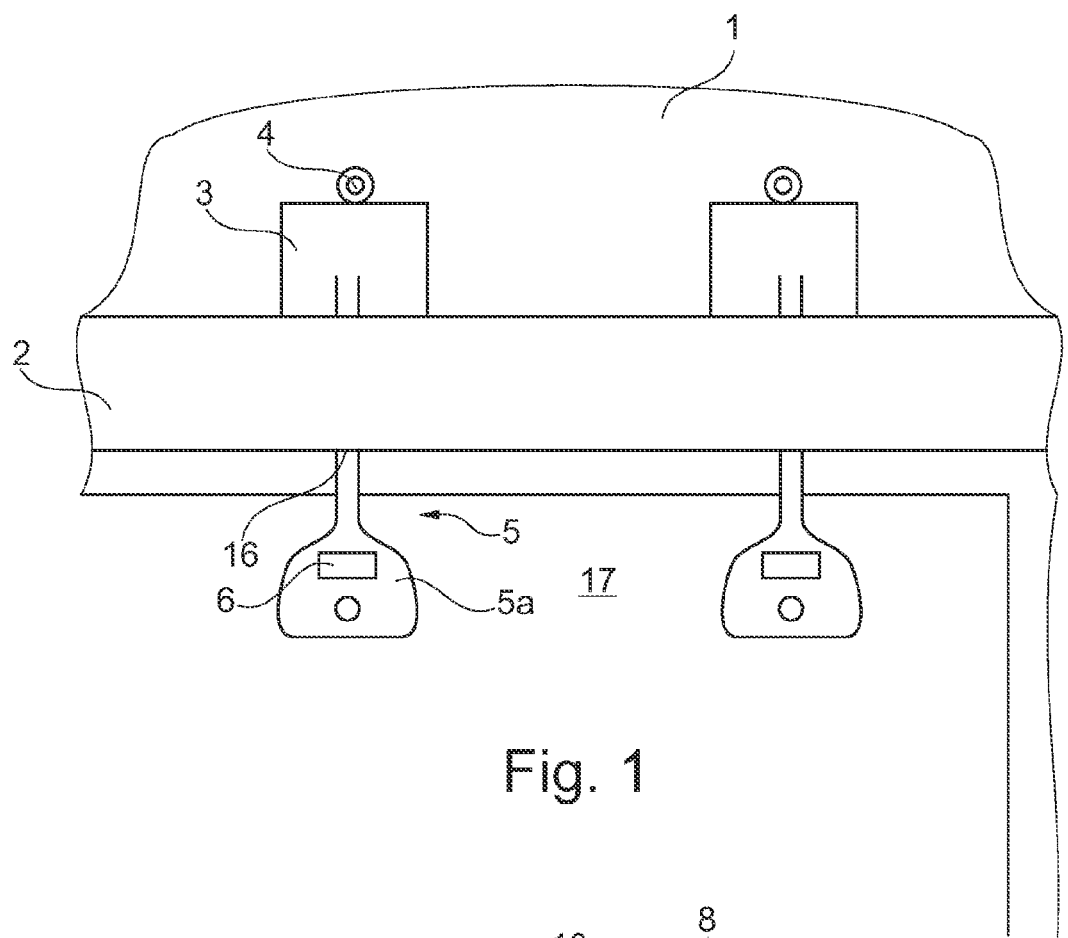
FIG. 1: Cut-out of a motor vehicle with curtain airbag fastened thereto
Figure 4:
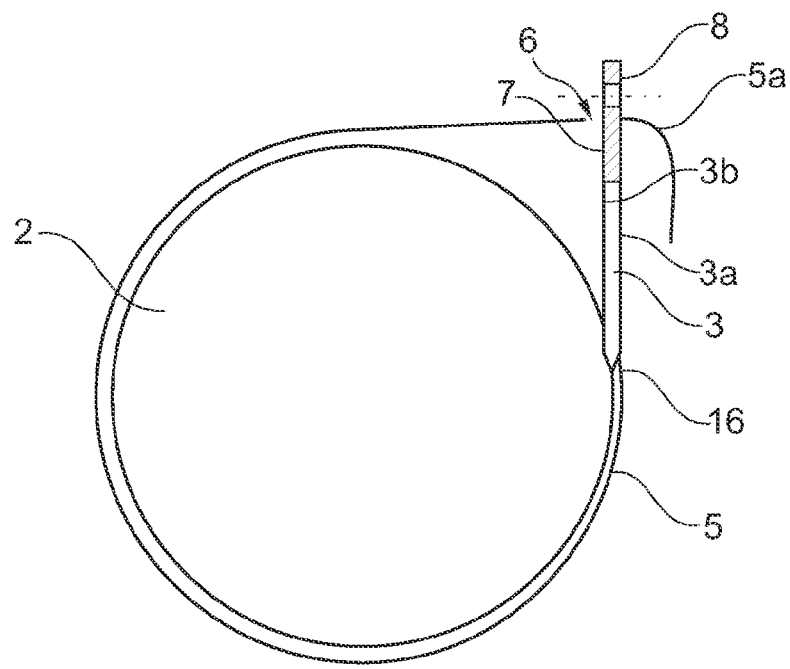
FIG. 4: Cross-sectional view of curtain airbag with lug and wrapper

First, FIG. 1 shows a cut-out of a motor vehicle 1 from the passenger compartment's view. A curtain airbag 2 is fastened to the car body above a window area 17. The curtain airbag 2 is provided with several lugs 3 and is mounted on the motor vehicle 1 by fastening means 4 as for example screws. The lugs 3 are further provided with wrappers 5, which have a one-piece configuration together with the lugs 3 and which extend from the same in the downward direction in the form of straps 16. The wrappers 5 are provided with openings 6 at their ends 5a, via which openings 6 the wrappers 5 can be fastened to the brackets 7, as can also be seen in FIG. 4. The representation shown in FIG. 1, in which the wrappers 5 hang down freely, has only been chosen for a better understanding of the invention. Of course, the wrappers 5 do not hang down the curtain airbag 2 neither in the state of its delivery to the vehicle manufacturer nor after its installation in the motor vehicle, but hold the same together to a package, as it is shown in FIG. 4.

Figure 2:
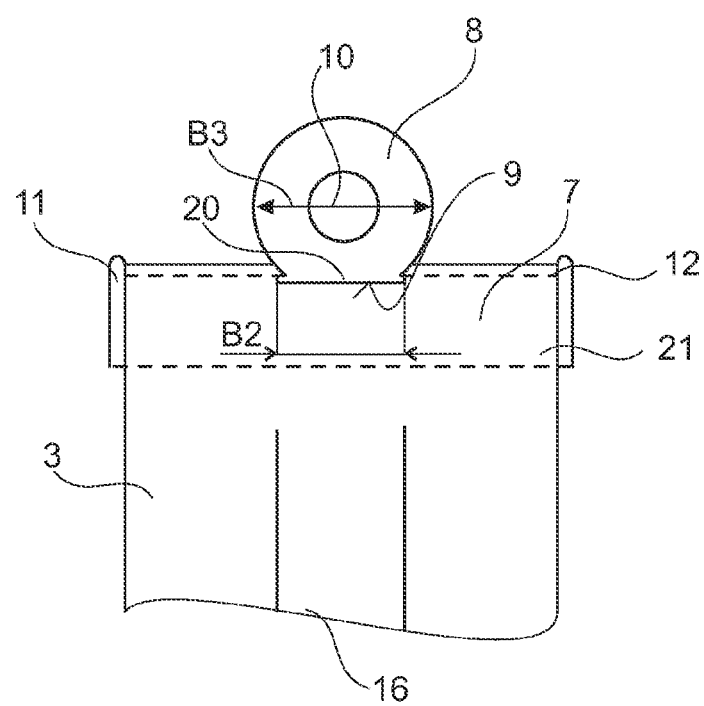
FIG. 2: Lug with bracket

FIG. 2 further shows an enlarged representation of the two-layer lug 3, in which the bracket 7 is located. The bracket 7 comprises a base body 21 and a fastening shoulder 8 projecting through an opening 9 of the lug 3. The fastening shoulder 8 is formed as a round eye and is connected to the base body 21 via a narrow point 20. The bracket 7 may deform under load in the narrow point 20 so that the bracket 7 does not further deform, in particular in the base body 21 region, which is important for the fixation of the position of the curtain airbag. The width B3 of the fastening shoulder 8 is chosen bigger than the width B2 of the opening 9 so that the bracket 7 can no longer slip out of the opening 9 with the fastening shoulder 8 after having been positioned in the same.

A round opening 10 is provided in the fastening shoulder 8 for the fastening to the motor vehicle 1, for example by means of a screw. The bracket 7 has a visibly bigger width than the lug 3 and is provided with dogs 11 and 12 in the region of the projecting edge, by which dogs the surface of the lug 3 contacting the bracket 7 is limited and the lug 3 is secured on the bracket 7 against slipping to the side. The bracket 7 rests against the inner surface of the fold 15 (see FIG. 3) with the whole side facing the fastening shoulder 8 so that the retaining force is distributed to the whole side accordingly.

Figure 3:
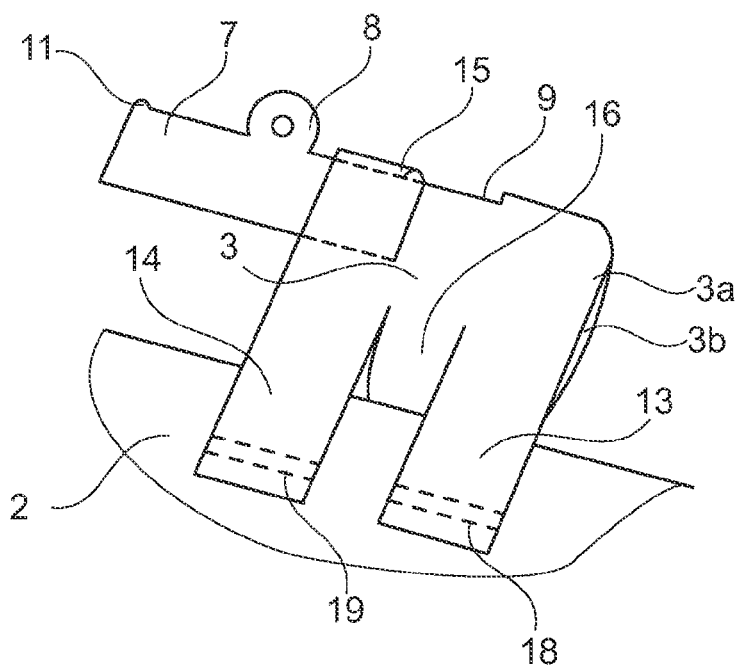
FIG. 3: Lug fastened to a curtain airbag with bracket partly inserted on the side

FIG. 3 shows the same lug 3, which is fastened to an edge of the curtain airbag 2 with two straps 13 and 14 by means of sewed connections 18 and 19. The lug 3 is formed by a layer 3a, which, being turned back upon itself, forms a second layer 3b, at the same time forming a fold 15. The lug 3 thus has a two-layer configuration, wherein the bracket 7 is partly inserted into the hollow space between the layers 3a and 3b. The layers 3a and 3b are provided with an opening 9 in the area of the fold 15; at the further insertion movement of the bracket 7 the fastening shoulder 8 is inserted into said opening 9. The opening 9 is formed by a slit, which can be widened to a bigger opening 9 in a very simple manner by being positioned in the area around the fold 15. As the width B3 of the fastening shoulder 8 is bigger than the width B2 of the opening 9, the latter has to be temporarily widened at the insertion movement of the fastening shoulder 8 or the fastening shoulder 8 rather has to be pushed through. Hereby, advantage is taken of the fact that the layers 3a and 3b are formed from a textile, which is easy to deform without being damaged thereby. The strap 16 extends between the straps 14 and 13, which strap 16, as can also be seen in FIG. 4, wraps around the curtain airbag 2 and forms the wrapper 5.

FIG. 4 shows a cross-sectional view of the curtain airbag 2 in the region of the two-layer lug 3. The bracket 7 is located between the layers 3a and 3b, which bracket is provided with a fastening shoulder 8 on its upper side. The wrapper 5, which is formed by the strap 16, wraps the rolled or folded curtain airbag 2 to a package and is subsequently mounted on the fastening shoulder 8 by the opening 6 provided in the end 5a. The end of the wrapper 5 is thereby secured on the narrow point 20 by the width B2 so that the same cannot slip off the fastening shoulder 8 when the opening 6 is dimensioned accordingly. The curtain airbag 2 in the form shown in FIG. 4 can then be delivered to the vehicle manufacturer as a pre-assembly unit, and can be fastened to the motor vehicle as a module by being fastened for example by means of screws in the opening 10. This representation shows the distinct advantage that now solely the fastening shoulder 8 has to be accessible for fastening the curtain airbag 2, whereas the lug 3 can have a substantially shorter and more stable configuration. After having been fastened to the motor vehicle, the end 5a is additionally secured by the fastening means and can no longer slip off the fastening shoulder 8. The fastening of the curtain airbag 2 is thus effected directly via the stiff bracket 7 by the fastening shoulder 8 resting against the car body 8 free of play and rattle-free.

Figure 5:
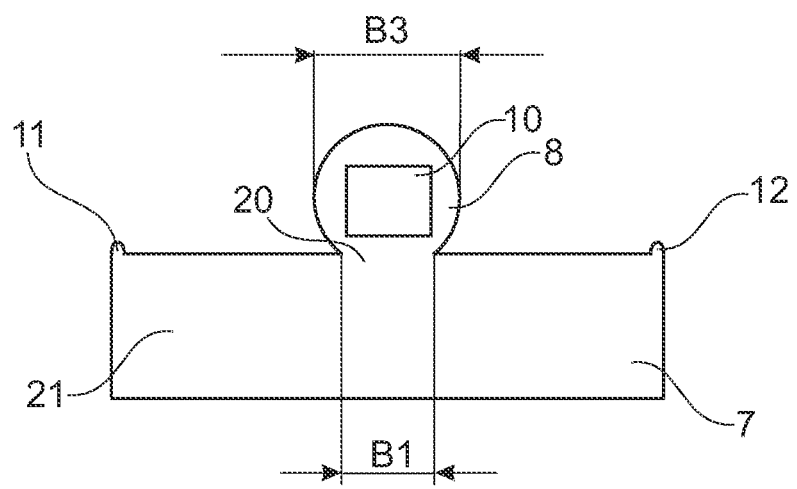
FIG. 5: Bracket with non-circular fastening opening

FIG. 5 shows an alternative embodiment of the bracket 7, in which the opening 10 has a non-circular, for example a rectangular or square form. The non-circular form of the opening 10 provides the advantage that the bracket 7 and thus via the lug 3 the curtain airbag 2 as well are fastened to the motor vehicle in a rotationally secured manner. In that case, for example a clips connection could be used for the fastening, which clips connection further provides the advantage that, in this case, no tools are required for fastening the curtain airbag 2. Any form can be chosen for the opening 10, depending on kind and form of the fastening means. As an alternative, the fastening can also be effected via a hook structure formed to the fastening shoulder 8 itself instead of via a fastening means.

Figure 6:
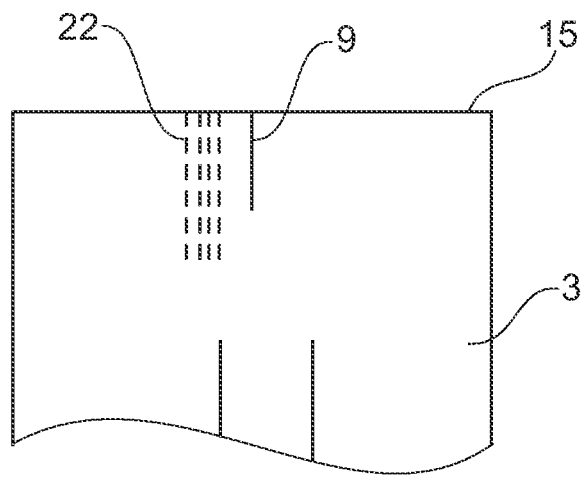
FIG. 6: Lug with fold having a perpendicular slit
Figure 7:
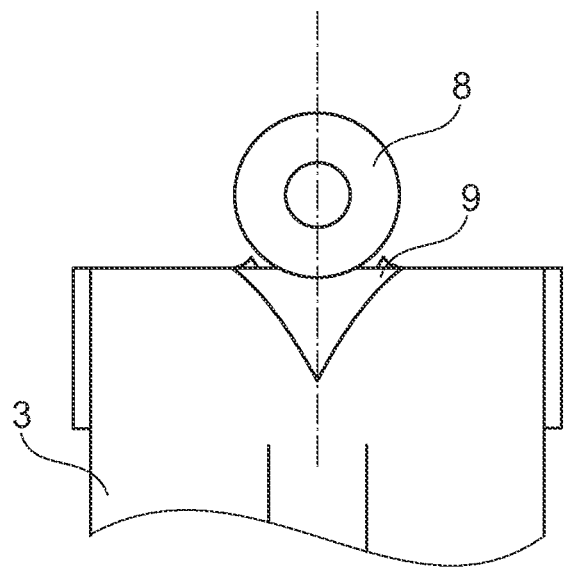
FIG. 7: Lug with widened slit and bracket inserted

FIGS. 6 and 7 show a further preferred embodiment of the invention, in which the opening 9 in the lug 3 is formed by a slit running perpendicular to the fold 15. By pulling apart the halves of the lug 3 separated from each other by the slit, the opening 9 can thus be widened to a substantially bigger opening 9 as shown in FIG. 7. Furthermore, the slit thus runs parallel to the warp threads 22 of the woven lug 3 so that the tensile strength of the same is not reduced. With a different orientation of the weaving direction, an alignment parallel to the weft threads could also be imagined.

The invention claimed is:

1. A curtain airbag for a motor vehicle comprising:
a two-layer lug for fastening to the motor vehicle formed by a first layer and a second layer, the first layer including a fold such that the first layer is folded back upon itself to the second layer, the two-layer lug including an opening proximate the fold and a bracket between the first and second layers, the bracket projecting through the opening with a fastening shoulder thereof;
wherein the curtain airbag is fastenable to the motor vehicle via the fastening shoulder.

2. The curtain airbag according to claim 1, wherein the bracket with one side rests against an inner surface of the fold.

3. The curtain airbag according to claim 1, wherein the bracket has a planar plate-shaped structure.

4. The curtain airbag according to claim 1, wherein the bracket has a greater stiffness than the lug.

5. The curtain airbag according to claim 1, wherein a width of the bracket is larger than a width of the lug and further wherein a surface of the lug contacting the bracket is laterally limited by dogs projecting from the contact surface.

6. The curtain airbag according to claim 1, wherein a side of the bracket via which a load is introduced from the curtain airbag into the bracket, is turned back upon itself in order to form a bigger radius.

7. The curtain airbag according to claim 1, wherein the fastening shoulder comprises a non-circular fastening opening.

8. The curtain airbag according to claim 1, wherein the curtain airbag is held together to a package by a wrapper and that the wrapper with one end is mounted on the bracket.

9. The curtain airbag according to claim 8, wherein the wrapper comprises an opening and that the wrapper is mounted on the bracket by the fastening shoulder engaging with the opening.

10. The curtain airbag according to claim 8, wherein the wrapper and the lug have a one-piece configuration.

11. The curtain airbag according to claim 10, wherein the lug is fastened to the curtain airbag by two spaced straps and further wherein the wrapper is formed by a third strap of the lug located between the spaced straps.

12. The curtain airbag according to claim 11, wherein a hollow space formed between the first and second layers is limited by the two spaced straps being fastened to the curtain airbag and/or by the two spaced straps extending in different directions in such a way that the bracket located between the first and second layers is secured against slipping out.

13. The curtain airbag according to claim 1, wherein the fastening shoulder is arranged on the bracket via a narrow point.

14. The curtain airbag according to claim 1, wherein a width of the fastening shoulder is larger than a width of the opening.

15. The curtain airbag according to claim 1, wherein the opening is formed by a slit, the slit perpendicular to the fold.

16. A bracket for fastening a curtain airbag to a motor vehicle comprising: a base body which can be positioned between two layers of the curtain airbag, and a fastening shoulder, which can be pushed through an opening provided along a fold line connecting the layers;
   wherein a width of the fastening shoulder is larger than a width of the opening.

17. The bracket according to claim 16, wherein the fastening shoulder is connected to the base body via a narrow point.

18. The bracket for fastening a curtain airbag to a motor vehicle of claim 16, in combination with the curtain airbag, the base body positioned between the two layers of the curtain airbag.

19. A bracket for fastening a curtain airbag to a motor vehicle comprising: a base body which can be positioned between two layers of the curtain airbag, and a fastening shoulder, which can be pushed through an opening provided in the connecting area of the layers, wherein the base body comprises dogs projecting from the contact surface of the layers of the curtain airbag.

20. A two-layer lug comprising:
   a first layer;
   a second layer;
   an opening; and
   a bracket between the first and second layers, the bracket including a mounting portion projecting through the opening;
   wherein the first layer includes a fold such that the first layer is folded back upon itself to the second layer, the opening being along the fold.

\* \* \* \* \*